(12) United States Patent
Bhagwat et al.

(10) Patent No.: US 6,721,805 B1
(45) Date of Patent: Apr. 13, 2004

(54) PROVIDING SHARED-MEDIUM MULTIPLE ACCESS CAPABILITY IN POINT-TO-POINT COMMUNICATIONS

(75) Inventors: Pravin Bhagwat, Scarsdale, NY (US); Chatschik Bisdikian, Mount Kisco, NY (US); Frank James Janniello, Stamford, CT (US); Ibrahim Korpeoglu, Yorktown Heights, NY (US); Mahmoud Naghshineh, Hopewell Junction, NY (US); Puneet Pandoh, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,951

(22) Filed: Nov. 12, 1999

Related U.S. Application Data

(60) Provisional application No. 60/108,068, filed on Nov. 12, 1998, and provisional application No. 60/108,069, filed on Nov. 12, 1998.

(51) Int. Cl.[7] .............................................. G06F 15/16
(52) U.S. Cl. ...................... 709/250; 709/230; 709/237; 370/465; 370/466; 370/467
(58) Field of Search ................................ 709/250, 230, 709/237; 370/465, 466, 467

(56) References Cited

U.S. PATENT DOCUMENTS 6,173,355 B1 * 1/2001 Falik et al. ................. 370/464
6,377,982 B1 * 4/2002 Rai et al. ..................... 709/217

OTHER PUBLICATIONS

"RangelLAN2 Serial Adapter Models 7910 and 7911 User's Guide", from Proxim Inc., dated Jun. 1999, pp. 1–96.*
"RangelLAN2 Access Point Models 7510 and 752x User's Guide", from Proxim Inc., dated Jun. 1999, pp. 1–121.*
"Rangel LAN2 7910 series Serial Adapter", from Proxim Inc., dated Jun. 1999, pp. 1–2.*

* cited by examiner

*Primary Examiner*—Zarni Maung
*Assistant Examiner*—Jinsong Hu
(74) *Attorney, Agent, or Firm*—Thomas A. Beck; Louis P. Herzberg

(57) ABSTRACT

The present invention provides shared communication medium capability to the plethora of computer devices, like the PCCAs, that normally are able to communicate with other devices via dedicated point-to-point links, e.g., via the practically universal RS-232 ports. It allows the sharing of the communication medium in a dynamic fashion depending on the instantaneous traffic demands by the various communicating devices. It further allows the emulation of point-to-point links over the shared communications medium in such a way that applications running on a PCCA use the shared medium transparently. Thus, this invention enables applications designed to operate over a point-to-point connection to operate over the shared medium without any modifications of the applications or the point-to-point devices. It enables the shared medium communications and dynamic communication resource allocation by using a device's I/O ports designed for point-to-point communications with dedicated communication resource allocation.

34 Claims, 10 Drawing Sheets

PROVIDING SHARED-MEDIUM MULTIPLE ACCESS CAPABILITY IN POINT-TO-POINT COMMUNICATIONS

CROSS-REFERENCE TO RELATED APPLICATIONS

This application claims priority from Provisional Applications, Ser. No. 60/108,068 and Ser. No. 60/108,069, both filed Nov. 12, 1998.

BACKGROUND

The number of devices that can be categorized as personal computing and communication assistants (PCCAs) increases daily. The PCCA class of devices comprises laptop and palmtop computers, personal digital assistants (PDAs), pocket organizers, cellular phones, pagers, etc. The general objective of all these devices is to allow their owner to organize himself or herself and contact his or her business in an orderly manner. This is accomplished by allowing a person to be accessible (almost) anywhere (using pagers and cellular phones), and by using personal information management (PIM) utilities like calendars, things-to-do, telephone books (using PDAs and organizers).

Many PCCAs are capable of being connected to a desktop computer for backing-up or updating data stored in them. Some PCCAs can also connect to data networks, like the Internet, via a modem and enable networked data services like e-mail and web-surfing. In general, PCCAs are capable of connecting to and interacting with other computer devices either directly or indirectly via intermediate communication devices, e.g., modems. In these cases, the PCCAs communicate to these other devices via point-to-point dedicated communication channels.

Dedicating a communications channel for the exclusive use of only two devices is not always desirable since it usually results in poor utilization of communication resources. For example, when a modem is used to connect a PCCA with a remote application server, only a single PCCA can use the modem to connect to the server. It is known that data transmissions are bursty in nature, in that data sources are mostly inactive, with occasional periods of data activity. During periods that the PCCA idles the modem could have been used by another PCCA to connect to the same or other application servers. Dedicating though the channel between a single PCCA and the modem does not allow sharing of the communication resources, e.g., the modem, among various communicating devices (the PCCAs and the application servers). Using separate modems and telephone lines to connect multiple PCCAs to application servers is not a very attractive solution as it prohibitively increases the cost of communication. In this case, sharing the communication resources is highly desirable because it reduces the cost of interconnecting several devices simultaneously.

Sharing communication resources is a common practice in local area networks (LANs), where a number of computer nodes connect with each other via a shared communication medium, e.g., twisted pair, cable, and air. Devices, also referred to as stations or nodes, attached to the LAN coordinate their transmissions using a commonly agreed medium access (MAC) protocol. The most popular MAC protocols are the IEEE 802.3 protocol, commonly referred to as Ethernet, and the IEEE 802.5 protocol, commonly referred to as Token Ring. Both of these protocols use a cable, such as a twisted pair or coaxial cable, as the transmission medium. A more recent protocol for sharing an over-the-air radio frequency (RF) band in LAN environments is the IEEE 802.11 protocol.

Network interface cards (NICs), or adapter cards, are added internally to a device in an expansion slot within the device and are used for interfacing the device to the transmission medium of the LAN. NICs are also attached externally via a device's PCMCIA slots (if available), usually referred to as PC card. PCMCIA cards provide functionalities similar to adapter cards that are usually added internally to a computer, e.g., memory cards, hard-disk drivers, modems, NICs, etc., but due to convenience and space are simply added externally to the computer. PC cards are not used for connecting PCCAs directly to each other.

However, not all PCCAs can be opened up to add a NIC and not all of them are equipped with PCMCIA, or other similar, ports to which NICs can be attached. Thus, some devices cannot be part of a LAN and share in the cost benefits that a shared medium LAN solution provides. Therefore, there is a need in enabling LAN-oriented communications for the plethora of PCCAs that are otherwise only capable of communicating with other devices one-at-a-time using dedicated communication resources.

FIG. 1 shows a typical scenario where a mobile host device 101, e.g., a personal digital assistant (PDA), connects to a desktop host computer 102. One reason for connecting the two devices is to back up data in the mobile host 101 to the desktop host 102. Another reason is to update data in the mobile host 101 with data in the desktop host 102. This process is usually achieved by using two complementary pieces of software, an interactive application client 103 residing on the mobile host 101 and an interactive application server 104 residing in the desktop host 102. The two complementary pieces of software check the latest data versions stored on the two devices and perform any necessary backups and updates.

The interactive application software modules use the services of a communication protocol stack 106 and 107 for transporting the data between the two hosts. A communication protocol stack is a collection of rules that governs how data is formatted and organized for transport between devices on a computer communication network. In the typical scenario shown in FIG. 1, the two communicating devices are connected using their serial ports 108 and 109. A typical communication protocol used is the RS-232 protocol. The RS-232 protocol requires, among other things, that data that is to be transported between two devices are sent serially one byte at a time and that each byte is prepending by 1 start-bit and 1, 1.5, or 2 stop bits. The number of stop bits is configurable and both communicating devices need to agree on the same number of such bits. The communication between the two devices is done using an RS-232 cable 110 wired in a null-modem configuration. Since, the two devices are directly connected to each other, no data addressing for routing to the correct destination is needed. Hence, the communication protocol stack in this case is quite shallow and no additional information is appended on the data to be transmitted except from the start and stop bits required by the RS-232 protocol.

Since, the only elements that are physically connected are the serial ports on the two devices, only the link 110 is a real one. Any other communication between the complementary software modules, like 105 and 111, is virtual in that it is performed using the services of a lower communication layer.

FIG. 2 shows another typical scenario, which expands the connectivity scenario in FIG. 1 over the public switched telephone network (PSTN) 204. In this case, the two host devices are first connected to a data communications equipment (DCE) 202 and 203, commonly referred to as a modem, via a regular RS-232 cable 201. When one modem transmits to another one, it modulates the information signal received from the serial ports 108 and 109 of the device it is directly attached too into an audible signal appropriate for transmission over the public switched telephone network (PSTN) 204. The receiving modem demodulates the waveform into an information signal appropriate for receipt by the receiving device. In the sequel, as well as in FIGS. 1 and 2, the terms mobile and desktop host could be interpreted rather generically as two computing end-devices able to exchange data over a proper communications means, e.g., point-to-point links, networks, etc.

FIG. 3 shows yet another realization of the connection scenario in FIG. 2. The mobile host 101 is connected again to PSTN 204 as in FIG. 2. In this case the communication protocol stack 302 in the mobile host includes not only the serial protocol 309, but also an industry standard transport control protocol/internet protocol (TCP/IP) 303 and point-to-point protocol (PPP) 306, as well. These protocols enable an interactive application on the mobile host 101, like a web-browser 312, to use the services of a corporate intranet data network 311 to connect to a corporate application host 301, e.g., a web-server 313. The application host 301 connects to the corporate intranet via a NIC 314, e.g., an ethernet or a token-ring card. A gateway device 307 sitting at the boundary of the PSTN and the intranet is responsible to converting the information signals received over the PSTN to packetized information for transmission over the intranet and vice-versa.

The communication protocol stack 302 comprises a number of protocols that enable the web-browser application 312 in the mobile host 101 to communicate with the web-server application 313 in the application host 301. The serial protocol 309 enables the communication 310 between the mobile host and the DCE over the physical RS-232 connection 201. The PPP enables the communication 308 between the mobile host 101 and the intranet gateway 307 over the PSTN 204. Finally the TCP/IP protocol enables the communication 305 between the mobile host 101 and the application server 301 over the corporate intranet 311.

All the connectivity alternatives shown in FIGS. 1 through 3 are manifestations of the great interest in providing interactive services to mobile hosts. These services are delivered to these hosts via their most popular interface, their I/O ports. These I/O ports include the serial ports, by far the most available, and in more rare occasions parallel ports, and USB ports. The latter two ports are available mostly on PCs. All these alternatives though use a dedicated intermediate resource, e.g., a dedicated modem, to access the required services. Also, during a connection establishment, communication resources are dedicated and fixed either in time, or frequency, or a spread-spectrum channel, e.g., a specific frequency hoping sequence for frequency hoping spread spectrum (FHSS) communication, etc. Dedicating communication resources for each connection guarantees a bounded maximum transmission speed even when the network is lightly loaded. No on-the-fly bandwidth allocation is possible, a common practice with LANs. In LANs, no communication resources are a priori reserved. The transmission bandwidth is shared only among the active stations that have something to transmit, rather than the total number of stations that are present in the network.

SUMMARY OF THE INVENTION

Thus, one aspect of the present invention provides shared communication medium capability to the plethora of computer devices, like the PCCAs, that normally are able to communicate with other devices via dedicated point-to-point links, e.g., via the practically universal RS-232 ports.

An additional aspect of the present invention allows the sharing of the communication medium in a dynamic fashion depending on the instantaneous traffic demands by the various communicating devices.

Yet another aspect of the present invention allows the emulation of point-to-point links over the shared communications medium in such a way that applications running on a PCCA use the shared medium transparently. Therefore, applications designed to operate over a point-to-point connection need no further modifications to operate over the shared medium.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

Figure 1:
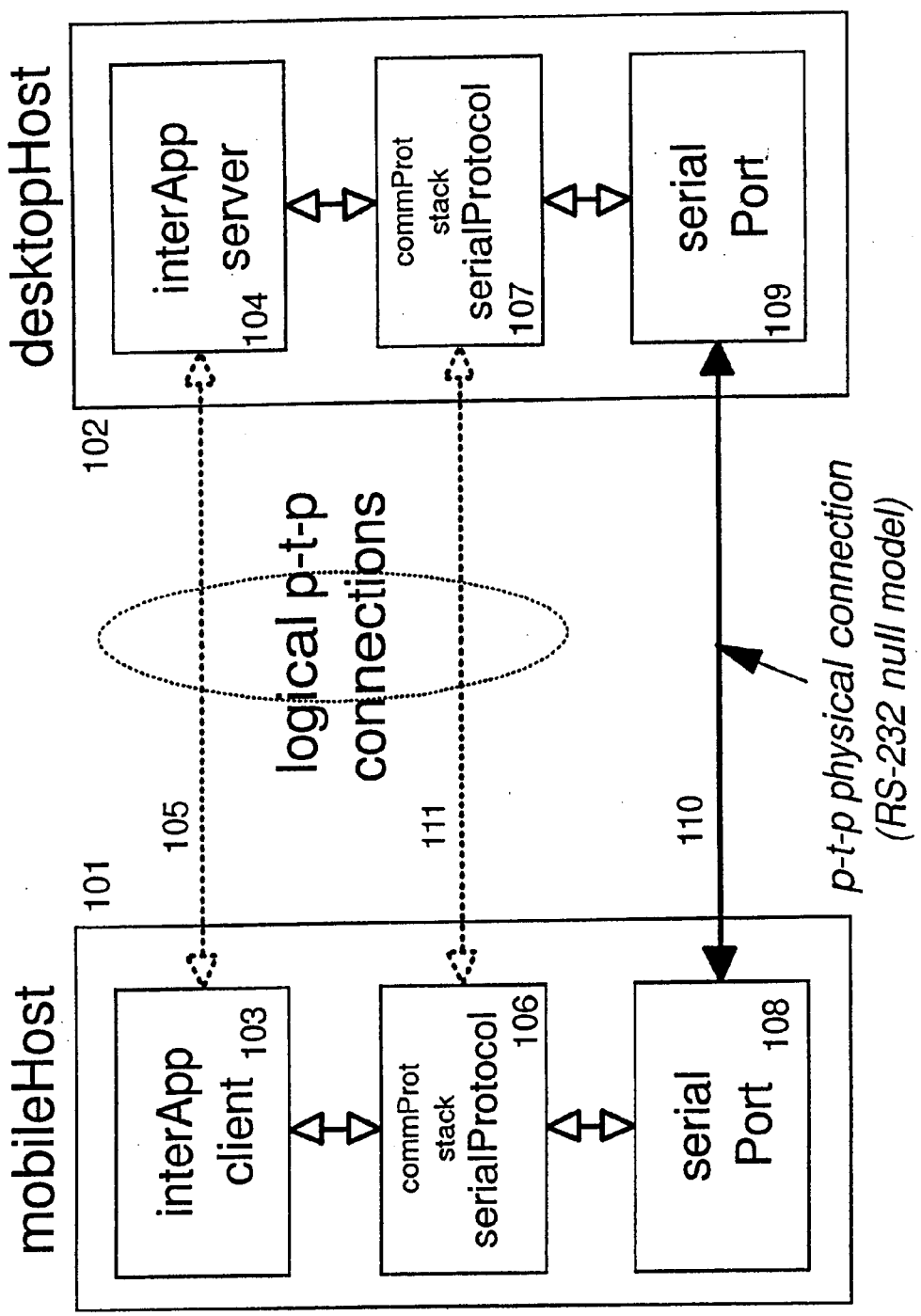
FIG. 1 shows two computing devices communicating with each other using a direct serial port connection.
Figure 2:
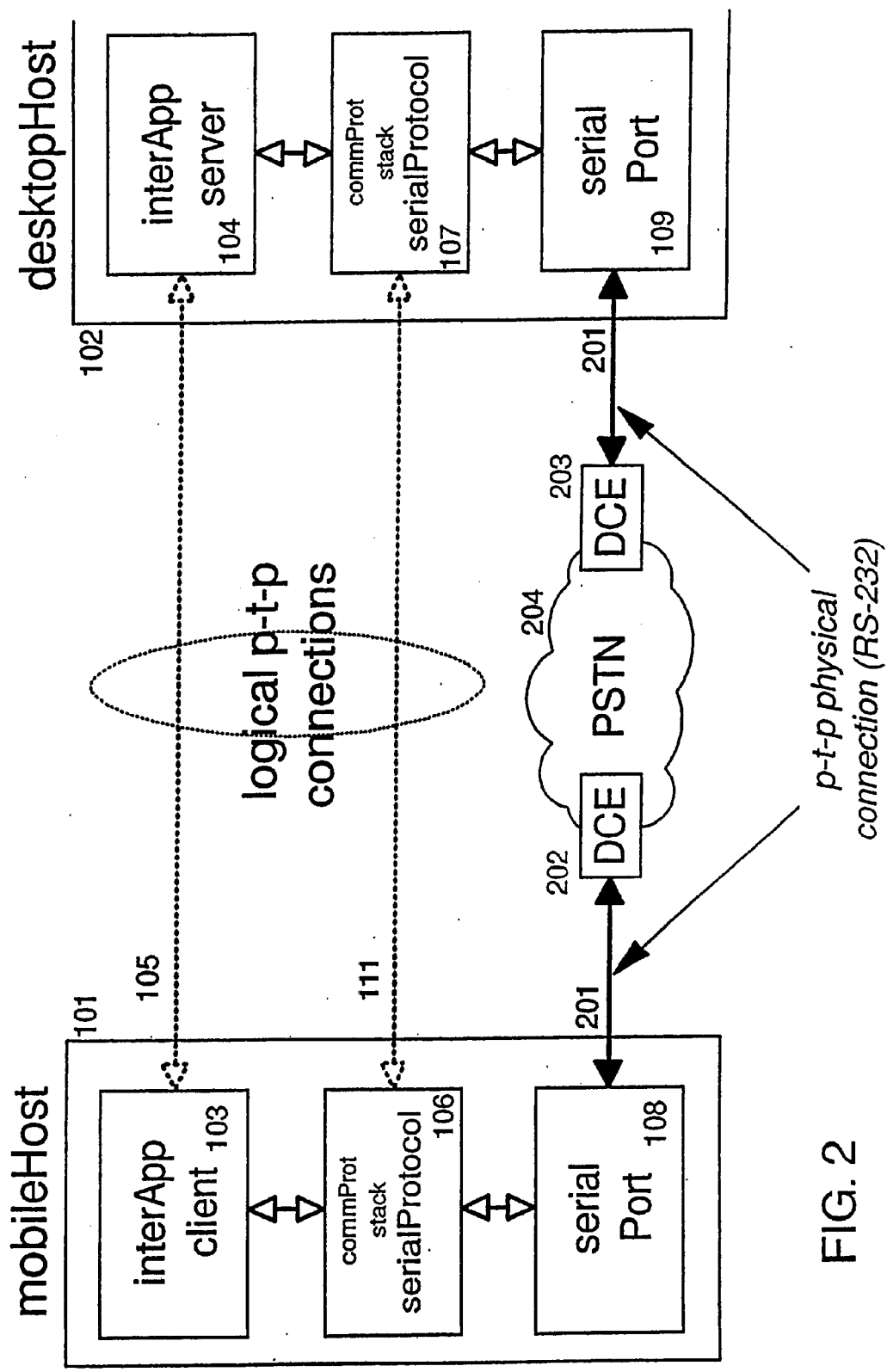
FIG. 2 shows two computing devices communicating with each other over the PSTN.
Figure 3:
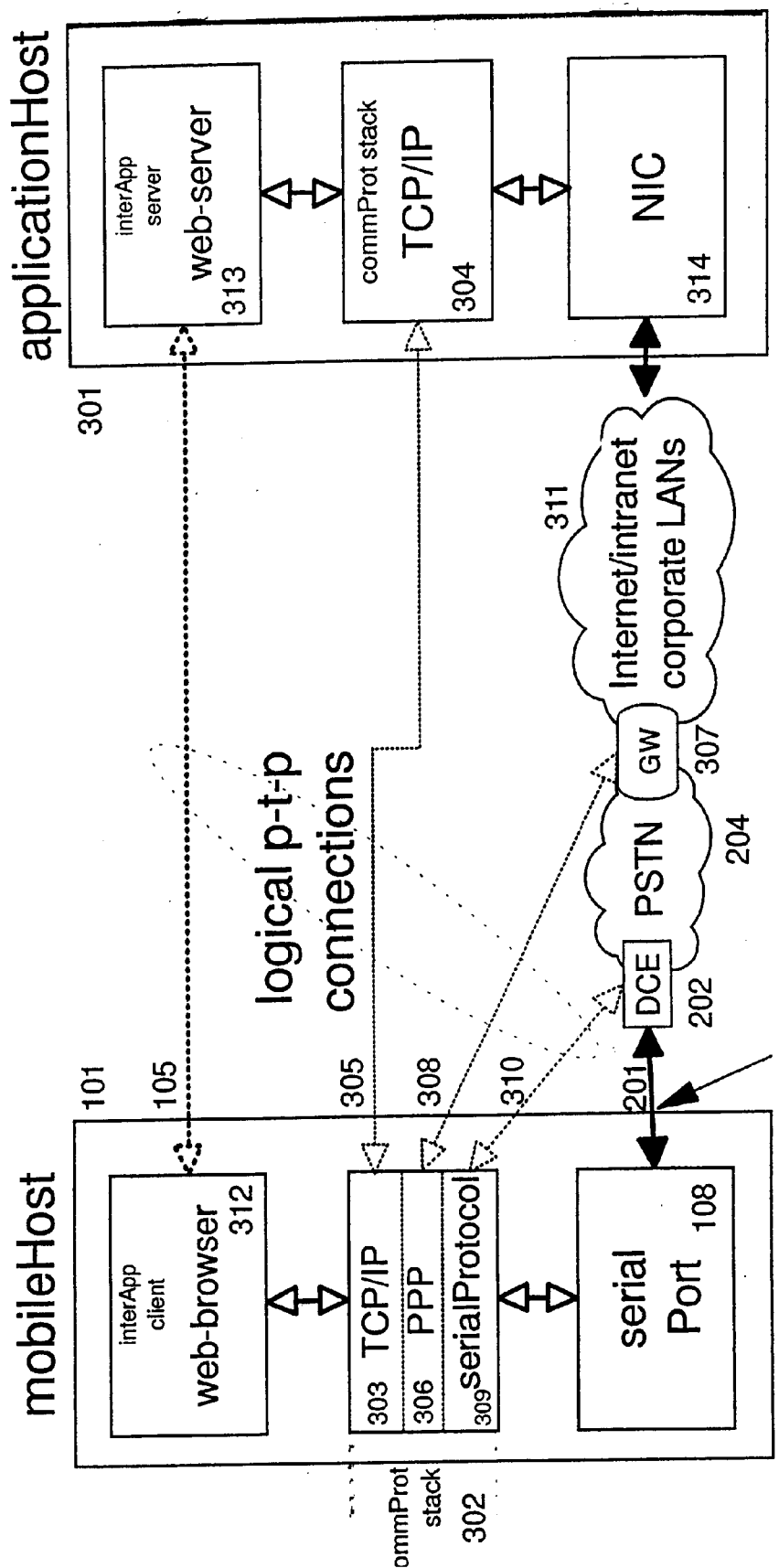
FIG. 3 shows two computing devices communicating with each other using both the PSTN and a corporate data network.
Figure 4:
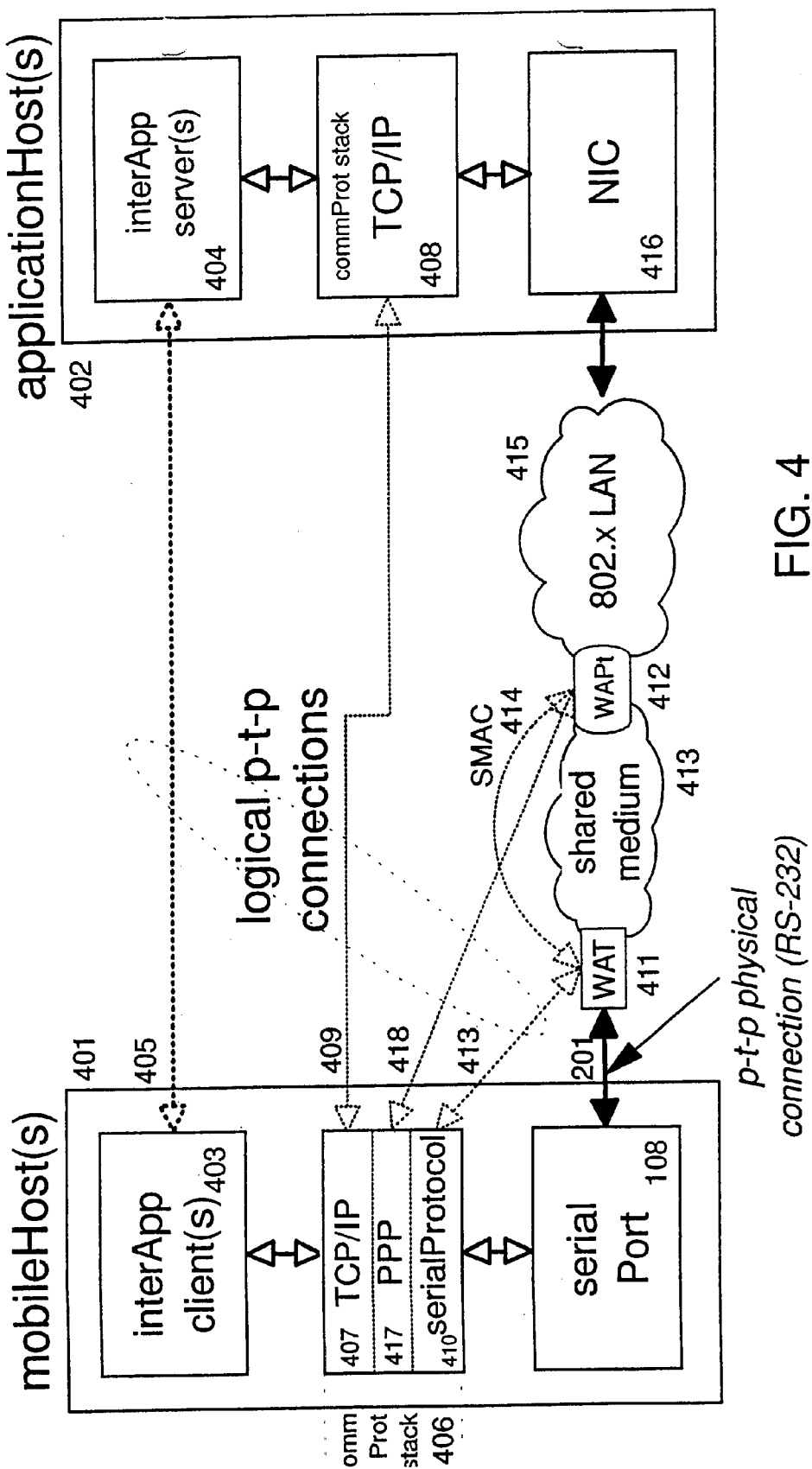
FIG. 4 shows an example of a computing device with a serial port attachment communicating with another computing device attached to a LAN, in accordance with the present invention.

FIG. 4 shows an embodiment of a network layout diagram for a system embodiment of the present invention. It shows one computing device with a serial port attachment communicating with another computing device, attached to a LAN, communicating with each other using a shared medium access control protocol, enabling the first device to use services on the LAN that the second device is connected to. The network includes a collection of mobile hosts 401 that run client applications 403 that interact via 405 with server applications 404 residing in application hosts 402. Appropriate communication stacks 406, 408 run on the communicating devices to support the application interaction. On the mobile host side 401, the TCP/IP protocol suite 407 is used running on top of the PPP protocol 417 which in turn runs on top of the serial port protocol 410. The latter protocol coordinates, via 413, the transmissions between the mobile host 401 and an externally attached module, herein referred to as wireless attachment (WAT) 411. The WAT is attached to the mobile host via the mobile host's serial port 108 via an RS-232 cable 201. On the side of the application host 402, TCP/IP 408 runs over an appropriate network interface card (NIC) 416, which attaches to an 802.x LAN 415, e.g., an Ethernet 802.3 LAN or a token-ring 802.5 LAN. The two TCP/IP modules 407 and 408 in a mobile host 401 and the application host 402, respectively, provide a logical (or virtual) path 409 over which the interactive application parts 403 and 404 communicate.

The WAT 411 communicates with a wireless access point (WAPt) 412 via the shared medium access protocol (SMAC) 414. The SMAC protocol is a MAC protocol capable of enabling dynamically sharing of the communication resources among multiple mobile hosts. In various embodiments the SMAC protocol is a polling-based protocol, an ALOHA or stack collision resolution protocol, or a combination of these. The WAT 411 enables shared medium communications to mobile hosts via their serial ports, which has been designed for dedicated point-to-point direct communications. The WAPt 412 is connected to the application host or hosts 402 via an 802.x LAN 415 as shown in FIG. 4. A PPP-based communication terminates within the WAPt 412 via 418. The latter is not absolutely necessary. PPP communications may terminate at a PPP-server within, for example, the LAN 415. The PPP-based communications may be absent whenever the PPP layer is absent from the mobile host.

It is noted that the layout in FIG. 4 is only an example of a layout. Those skilled in the art may implement other embodiments without departing from the spirit and concepts of the present invention. In these related embodiments, different combinations of communication protocols may be used with different combination of networks to connect mobile hosts to application hosts. An aspect of the present invention is to enable shared medium communications and dynamic communication resource allocation using a device's I/O ports designed for point-to-point communications with dedicated communication resource allocation.

Figure 5:
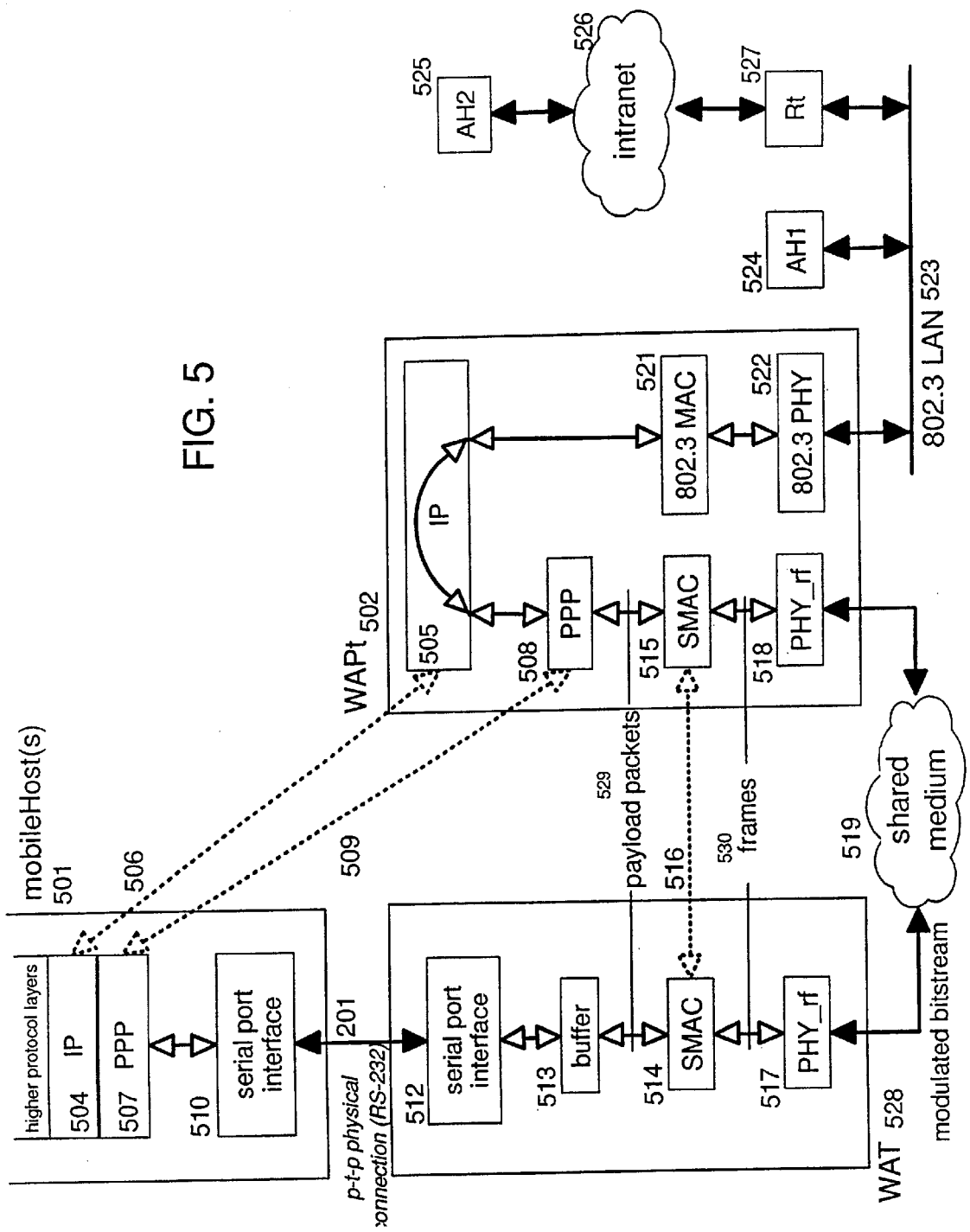
FIG. 5 shows an example of architectural components of a wireless attachment and a wireless access point that enable the communication scenario shown in FIG. 4.

FIG. 5 shows an example embodiment of how a wireless attachment (WAT) 528 and the wireless access point (WAPt) 502 are organized. The role of these two devices is to provide dynamically adjustable shared medium communication capabilities between mobile hosts 501 and various application hosts 524 and 525. The WAT 528 attaches to its mobile host 501 via 201 using serial port interfaces 510 and 512. Here, the serial port interface include of both the actual physical serial port and the firmware components, e.g., a UART 16550 chip, which executes the RS-232 serial port protocol that transfers information between the mobile host and the WAT. See 410 and 108 on FIG. 4. Note that the two interfaces may be custom built to directly attach to each other, or alternatively the interfaces may connect via an RS-232 cable 201.

On the mobile host side of the embodiment shown, the networking protocol used is the Internet protocol (IP) 504, while the link protocol is the point-to-point (PPP) 507 protocol. Both of these protocols are industry standards. Within the WAT a buffer 513 is provided to store the incoming information from the mobile host. When sufficient information has been accumulated, which for this embodiment implies that a whole PPP packet has been transferred from the mobile host 501 to the WAT 528, a payload packet 529 is formed. The payload pocket 529 is passed to the SMAC protocol module 514. The SMAC protocol adds an SMAC header to the payload packet to form an SMAC frame 530. The SMAC protocol module on the WAT has a corresponding module 515 in the WAPt 502. The two SMAC modules coordinate the transmission of SMAC frames 530 among several mobile hosts 501 and the WAPt 502 using the rules of a shared medium access protocol.

Any number of shared medium protocols can be used here, but a simple yet powerful polling-based protocol is selected for this embodiment. According to the polling SMAC, the WAPt polls each mobile host in turn allowing it to transmit. The rate of inquiring particular mobile hosts may be dynamically adjusted based of transmission activity and quality of service requirements from or to a particular mobile host. In this manner, the transmission medium is utilized very efficiently and communication bandwidth is reallocated among the mobile hosts dynamically whenever needed.

In a polling-based SMAC, the SMAC portion of the protocol executed by the WAPt and the WATs are non-identical (or, asymmetric) but nevertheless complementary. The WAPt and WAT portions of the SMAC are non-identical because the WAPt and the WATs have distinct non-identical roles. The WAT transmits only when instructed by the WAPt. The two parts of the SMAC are complementary in the way information is organized (in SMAC frames), transmitted, and interpreted to guarantee the proper operation of the communication system. The asymmetric nature of the polling-based SMAC protocols has the advantage of permitting most of the medium access intelligence to be placed in a WAPt. This MAC intelligence could be frame transmission scheduling, e.g., to which or from which WAT the next transmission will happen, when to invite new WATs to join the network, etc. This allows very little of the medium access intelligence to be placed in the WAT. This permits use of simple, low-cost, and power-efficient WATs.

Actual transmission of SMAC frames wirelessly over the air 519 is executed using the PHY_rf ("rf" stands for radio frequency) modules in the WAT 517 and the WAPt 518. The PHY_rf receives the information included in an SMAC frame and transmits it over the air. Differing embodiments employ PHY_rf layer alternative implementations. In one embodiment a simple frequency shift keying modulator is used for the air transmission, wherein the base frequency of a carrier is modulated to two adjacent frequencies depending on whether a 0 or an 1 is to be transmitted.

The WAPt 502 communicates over two media. One is the air that is used to communicate with the mobile hosts. The second is an IEEE 802.3 LAN 523 to which application servers 524 and 525 are either connected directly or via a corporate intranet 526. In the latter case, a router device 527 connects the LAN 523 to the intranet 526. On the one hand, the role of the WAPt 502 is to coordinate, send, and receive payload packets from the mobile hosts. On the other hand, the WAPt directs the payload packets to the appropriate application host, and/or directs packets from the application hosts to the appropriate mobile host.

To accomplish traffic bridging between the two media, the WAPt directs payload packets it receives from the SMAC module 515 to the PPP processing module 508. The PPP processing module 508 the exchange of PPP packets with its corresponding PPP module 507 in the mobile host via 509. The existence of the PPP module in the mobile host is not a requirement. It is typically present in devices that use modems to connect to the PSTN. Alternatively, the PPP module may exist within the WAT or not exist at all in which case, the PPP module 508 in the WAPt is not needed.

Following processing in the PPP module 508 on the WAPt, IP packets are exposed and delivered to the IP processing module 505. This module has a corresponding module 504 in the mobile host. It is used to exchange IP packets between devices via 506. The IP packet is then encapsulated within an 802.3 MAC frame in the 802.3 MAC layer processing module 521 and sent out on the 802.3 LAN 523 using the transmission protocol for the 802.3 LAN 503 via the 802.3 PHY 522. An application host receives this packet directly from the 802.3 LAN, as for application host 524, or indirectly over a corporate intranet 526, as for application host 525. In the latter case, the corporate intranet connects to the LAN 523 via a router device 527. In some cases there is direct attachment of an application host to a WAPt instead of a LAN.

In an embodiment the WAT is implemented using a DOS-based PC board comprised of a processor (CPU), sufficient buffer for creating and processing the SMAC frames, and a serial port interfacing to the mobile host. An additional serial port interface is sometimes used to connect to the RF portion of the WAT, i.e., the PHY_rf module.

Similarly, the WAPt may be implemented using an embodiment with the same components as the WAT. However, it is advantageous to use a more powerful platform. This is because the WAPt should be able not only to receive from and transmit to the WATs but to coordinate transmissions, to and from, several WATs as well. It moreover should be able to process the PPP packets themselves. For these reasons, the WAPt is generally run on a more powerful platform, like a UNIX-based workstation, whose serial port interfaces with the radio front-end.

A number of medium access protocols that can dynamically adjust their operation to traffic demands can be used for SMAC. A particular such polling-based SMAC protocol is described below. It is assumed that SMAC frames considered for this embodiment have the format shown in FIG. 6. Each frame has the following fields: (a) the start (SFD) 601 and end (EFD) 602 frame delimiters; (b) the header 603; (c) the payload 604, which need not be present in all frames; and the frame check-sum (FCS) 605.

The SFD 601 and EFD 602 are used to identify the beginning and the end of a frame transmission. The header field 603 includes a number of additional fields carrying information related to this transmission. The header fields are the frame length (fL) 606 that has the total length of the frame excluding the SFD and EFD fields, the network id (nI) 607 that identifies the particular wireless network to which a particular mobile transmits and receives frames, the MAC address (mA) 608 that identifies the mobile host from (resp. to) which a transmission originates (resp. is destined). The frame type (fT) 609 identifies the specific type and additional contents of a transmitted frame. The payload field 604 carries the information that is needed by higher layers in the recipient station. These higher layers could be the end-user application, or layers that manage the WAT and WAPt stations and the communication link between them. This may be for example a command sent by the WAPt to a WAP to go to sleep to conserve power. The FCS field 605 is used to check whether the frame received has been received correctly. The FCS 605 is often based-on an industry standard like CCITT-16 or CCITT-32, or can be customized to an application. The CCITT-16 is chosen in the present embodiment the FCS field may be absent altogether for increased transmission efficiency. In this case, it is best that at least the header itself be protected with a header checksum (HCS) so as to guarantee that the frame is not received by an incorrect recipient. The HCS may also be present independently of the FCS.

Figure 6:
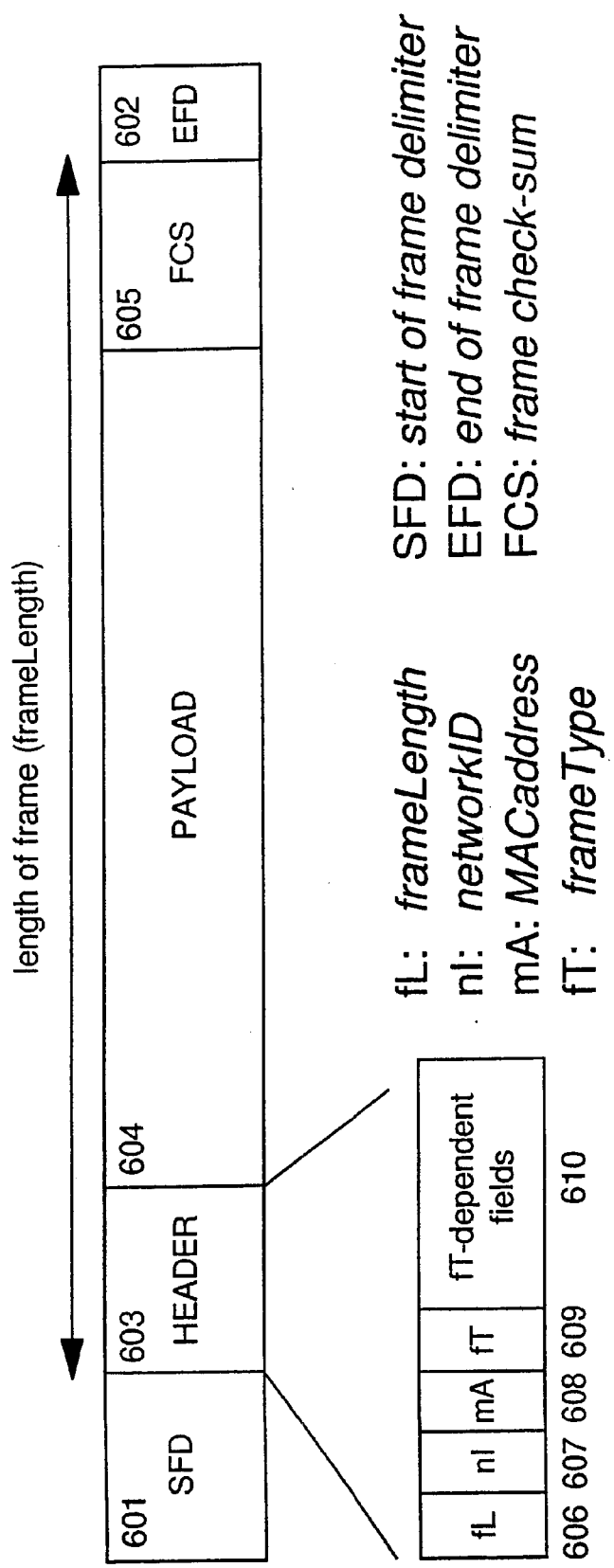
FIG. 6 shows an example of general format of an information frame transmitted between the wireless attachment and the wireless access point in accordance with the present invention.

A large number of frames exchanged between a mobile host and the access point can be defined that comply with the frame format shown on FIG. 6, or a similar one. Now consideration is given to fundamental frame types that are related to transferring application level payloads. It is assumed that all frames are transmitted using SMAC, so only the information fields not shown in FIG. 6 are presented, as for example the frame type dependent fields 610. These fields as well as the field shown in FIG. 6 are used in the present embodiment. Those skilled in the art may use them in a different context, elect not to use them altogether, or use less or more fields within the scope of the present invention.

In the present embodiment, the POLL frame is sent from the WAPt to a WAT. It includes the seqNumberNext and the transProb information fields described in Table 1.

TABLE 1

The POLL frame

| | |
|---|---|
| seqNumberNext | the sequence number of the frame that the WAPt is expecting to receive from the WAT |
| transProb | a transmission probability parameter used to control the retransmission of PAYLOAD frames that collide with each other |

Normally, the POLL frame is sent from the WAPt to a unique WAT to check whether it has a PAYLOAD frame ready to transmit. Sometimes, especially at low traffic loads, the WAPt may poll collectively a group of WATs whose PAYLOAD frame transmissions may collide. The transProb field is used to control the retransmission of such collided packets to reduce the probability of any collision to occur again. In cases where a group of WATs is polled, the seqNumberNext field is inconsequential. A group of WATs is identified by a special group MAC address assigned to all members of the group (See 608 in FIG. 6).

To further stress the fact that a POLL frame is destined to a group of WATs instead of a single WAT, a contentionIndication field is added. Setting the contentionIndication implies that as a result of this POLL multiple WATs may respond and possibly cause a collision. Alternatively, these special POLL frames may be so identified by a distinct frameType field value as GroupPOLL frames. See 609 in FIG. 6. Collision resolution of collided frames is done by the WAPt adjusting appropriately the transProb field in the POLL (or GroupPOLL) frame.

The PAYLOAD frame is sent from a WAT to the WAPt following a POLL frame, or sent from the WAPt to the WAT and includes the following additional information fields: seqNumber, flushIndicator, segmentationState and payloadSize shown and described in Table 2.

TABLE 2

The PAYLOAD frame

| | |
|---|---|
| seqNumber | the sequence number of this frame; used to distinguish between retransmitted frames |
| flushIndicator | if set, upon receipt of this information, the recipient station resets the counter where the sequence number of the frame to be received is stored |
| segmentationState | this field specifies if the sent frame contains the beginning, middle, or end portion of a large payload packet |
| payloadSize | this field is used to determine the end of the payload field in a variable length frame |

While other frames, like the POLL and ACK, are generally of fixed size, the PAYLOAD frames are allowed to be of variable size by permitting variable size payloads fields. The payloadSize field is used to determine the end of the payload field. Since, a frame already includes a frameLength field the payloadSize field is not really necessary (See 606 in FIG. 6). It is used for easing the processing of the frame.

Additional fields in a PAYLOAD frame header sometimes include a continuation indicator, notifying the recipient that the transmitter has more information to send to the recipient. This information is useful to the WAPt in rescheduling a prompt polling of the WAT. Also, an implicit acknowledgment signal can be sent with the transmission of a PAYLOAD frame to acknowledge a PAYLOAD frame just received in the opposite direction, without requiring the explicit sending of an ACK frame. Also a PAYLOAD frame, sent from a WAPt to a WAT, may include a poll indicator. In this case the PAYLOAD frame serves as an implicit POLL frame as well. The cases where PAYLOAD frames also serve as implicit POLL and ACK frames, or include a continuation indicator, are examples of bandwidth saving enhancements to the SMAC protocol. An ACK frame is sent to acknowledge the correct receipt of a payload frame and it includes the seqNumberNext field described in Table 3.

TABLE 3

The ACK frame

| | |
|---|---|
| seqNumberNext | the sequence number of the next frame expected to be received, thus acknowledging all frames received up to the number seqNumberNext-1 |

The absence of an ACK frame following a transmission of a PAYLOAD frame implicitly signifies that the PAYLOAD frame has not been received correctly.

The previous frames are used for carrying information between WATs and a WAPt after these WATs have registered to the network that a WAPt controls. Below are some of the registration frames used to exchange information between a WAPt and an unregistered WAT. The registration process starts by sending an invitation POLL frame from the WAPt to the unregistered WATs. The invitation POLL frame is exactly the same as a regular POLL frame, except that it is sent to a specially reserved group address for unregistered WATs. In an alternative embodiment, these special POLL frames are identified by a distinct frameType field value as InvitationPOLL frames (See 609 in FIG. 6).

After an unregistered WAT receives an invitation POLL (or InvitationPOLL) frame, it replies with an InvitationPAYLOAD frame which includes the following additional information fields: seqNumber, flushIndicator, segmentationStatus, payloadSize; a payload field including WATaddress and prtVersion, shown and described in Table 4.

The WAT address is usually referred to as the hardware address of the WAT. It is a unique identifier for the WAT and typically a 48-bit IEEE address is used for this purpose. Additional information regarding the WAT can be provided by the WAT in the payload field, for example the WAT may notify whether it supports power conserving sleep modes, authentication, and encryption type or version, payload or header compression, etc.

TABLE 4

The InvitationPAYLOAD frame

| | |
|---|---|
| seqNumber, flushIndicator, segmentationStatus, payloadSize The payload field contains the following information: | these fields are similar to corresponding fields in a regular PAYLOAD frame |
| WATaddress | a unique identifier for a WAT |
| prtVersion | the protocol version supported by the WAT: used for loading the appropriate protocol drivers |

TABLE 5

The RegistrationPAYLOAD frame

| | |
|---|---|
| seqNumber, flushIndicator, segmentationStatus, payloadSize The payload field contains the following information: | these fields are similar to corresponding fields in a regular PAYLOAD frame |
| WATaddress | the unique identifier of the WAT |
| prtVersion | the protocol version supported by the WAPt: used for loading the appropriate protocol drivers |
| MACaddress | the MAC address assigned to the WAT |
| maxPayloadSize | the maximum payload size allowed on the network: used for buffer management |

Following the invitation of unregistered stations and the collection of InvitationPAYLOAD frames from the WATs, the WAPt registers the WATs in its network. The WAT sends to each WAT to be registered a RegistrationPAYLOAD frame that includes the following information: seqNumber, flushIndicator, segmentationStatus, payloadSize; a payload field that includes WATaddress, prtVersion, MACaddress and maxPayloadSize, described in Table 5.

If the MAC address is the same as the WAT hardware address included in the InvitationPAYLOAD frame, it is not needed in the RegistrationPAYLOAD. Commonly though for better bandwidth utilization, a temporary MAC address smaller than the WAT hardware address is used. This is an 1-octet MAC address as opposed to a 6-octet IEEE address. In this embodiment's case, the MAC address has limited scope in that it is unique only within the particular network in which the WAT is currently registering. This MAC address is further associated with the network ID field in the header of the frames sent by the WAPt that identifies the network in which the WAT is currently registering (See 607 in FIG. 6). Additional registration information provided to the WAT from the WAPt regarding its operation in the network can be provided by the WAPt in the payload field, for example the WAPt may notify which additional features and which version does the WAPt supports, e.g., power conserving sleep modes, authentication, and encryption, payload or header compression, etc. A WAT is authenticated when it is determined that it is allowed to be connected to a particular WAPt. This may occur either during or following the end of the registration process.

Transmissions between the WATs and an WAPt are generally under the control of the WAPt. The transmissions are organized in phases depending on the particular set of frame types to be exchanged next. The decision as to which phase is to be executed next is the responsibility of the WAPt phase-scheduling module. The WAPt phase-scheduling module is a piece of software and/or specialized hardware that makes decisions on whether to poll a WAT for a WAT frame transmission, send a frame to a WAT, or send it a station management command. An example management command is, "goto sleep for 5 seconds," etc.

Figure 7:
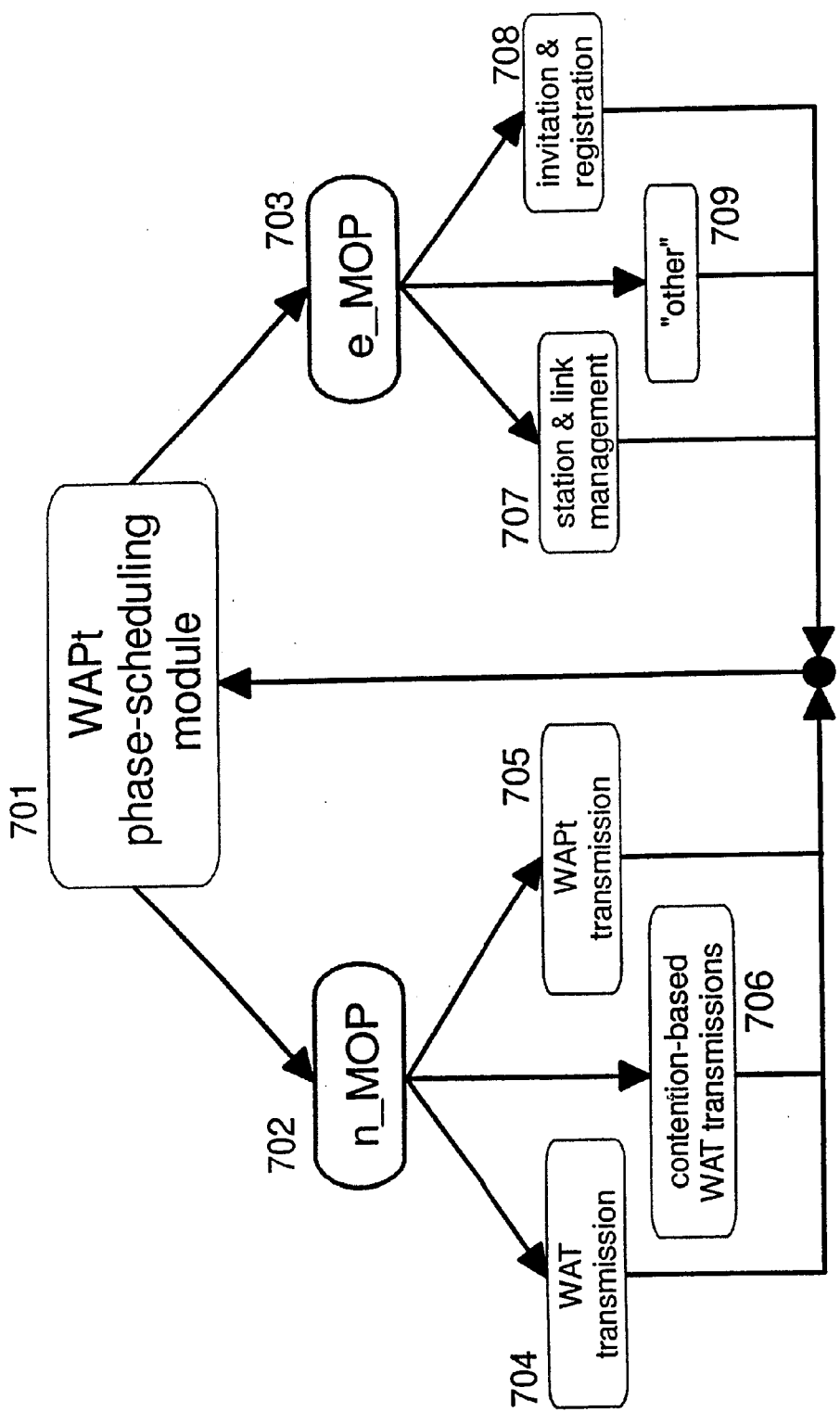
FIG. 7 shows an example of a modular architecture of a medium access protocol that coordinates frame transmissions between a wireless attachment and a wireless access point in accordance with the present invention.

FIG. 7 shows an example embodiment of types of phases that the WAPt phase scheduling module 701 decides upon. Alternatively, FIG. 7 shows the phases that a WAPt enters to coordinate and control the frame transmissions, and provide for the smooth operation of the communication system it manages. The various phases are organized in two sets called the normal mode of operation (n_MOP) 702, and exceptional mode of operation (e_MOP) 703. The n_MOP phases include all regular transmissions of frames that contain payload packets of interest to layers higher than SMAC, like application level information. The e_MOP phases include all other transmissions that are mostly related to managing the WATs and the link between them. The two modes of operation are not totally independent. For example, the WAPt may poll a WAT to transmit a payload frame, and the WAT may respond by transmitting a link control frame. The WAPt may then activate the appropriate e_MOP phase to complete the transaction. It is noted here that the distinction between n_MOP and e_MOPs is done merely for categorizing an example of frame exchanges taking place between the WATs and the WAPt. Those skilled in the art may categorize these frame exchanges differently without escaping the scope of the present invention.

The WAT transmission phase 704 starts with the WAPt polling a specific WAT, receiving a payload frame from it and then acknowledging the payload. When the WAT has no payload to transmit a frame carrying this information may be sent instead, or a time-out period is allowed to expire at the WAPt prior to deciding what to do next. The WAPt transmission phase 705 starts with the transmission of a payload frame from the WAPt to a specific WAT, (or a specific group of WATs,) and receipt of an acknowledgment for this transmission. The contention-based WAP transmission phase 706 starts with the WAPt polling a group of WATs. The WATs that have payload to transmit may then respond with an ACK. An ACK should be used here to reduce the waste of bandwidth resulting from a collision of frames. If a collision occurs the WAPt performs collision resolution. It uses more contention-based WAP transmissions where the polled WAPs may readjust their transmission probabilities based on information included in the transProb field in a POLL frame. When a collision is resolved the WAPt reads the MAC address of the WAT that sent the acknowledgment frame and schedule an explicit poll of the WAT in the future. A collision resolution process may be interrupted for the execution of another phase of the transmissions and then resumed at a later time.

The station & link management phase 707 includes the related transactions exchanged between a WAT and the WAPt. Some of these exchanges may have started while the WAPt sends a regular POLL frame to a WAT and the WAT responds with a frame that is identified as containing station and link management information. A station and link management frame contains information used by the two communicating devices to control their behavior and control the transmission medium between them. For example, a command to send a WAT to sleep is part of a station management transaction. A WAT asks to use a particular forward error correction protocol and/or to authenticate itself as part of a link management transaction. The registration and invitation phase 708 pertains to the exchange of messages for inviting and registering new WATs in the network. The "other" phase block 709 is a spare phase used for future enhancements and/or testing of new features in the SMAC protocol. This may be done prior to fully incorporating these new features into SMAC.

The "other" phase block 709 is part of a modular philosophy behind the SMAC protocol. The SMAC protocol has a core module that includes the basic transmission and reception of data. Additional modules or phases are generally implemented as self-sufficient sequences of frame exchanges. Each such phase can be added to the core SMAC module to enhance its capabilities. The SMAC protocol can thus be written in steps. Each step comprises a phase. Each new step can be tested as it is developed and then incorporated in what has already been incorporated into the protocol. With the general frame format as shown in FIG. 6 already decided, adding a new phase and associated frame types only needs the new set of frame-type dependent fields to be defined and added into the processing module of SMAC. This includes the additional software that is specific to processing the new frame type. Moreover by separating the WAPt phase-scheduling module from the actual frame transmission and receipt process, the development of the two components can be decoupled.

In an embodiment, the WAPt phase-scheduling module employs a simple process that cyclically goes through a list of phases, e.g., activate WAT transmission from WAT number 1, activate WAPt transmission to WAT number 1, repeat likewise for WAT number 2, send invitation frames, repeat from the beginning, etc.

In an alternate embodiment, the WAPt phase-scheduling module is quite elaborate. In this case, it decides what to do next based on traffic activity with specific WATs. For example, stations that have something to transmit are polled more often than stations that are currently inactive. The scheduling could is based on information gathered from the continuationIndicator fields from specific WATs and/or the knowledge about the quality of service demands from a specific WAT. For example, WAT number-4 may have an isochronous voice connection with the WAPt. So WAT number-4 is polled on a strict periodic fashion. In general, based on a desired performance level of the WAPt, the WAPt phase-scheduling module can be made as simple or as elaborate as needed, without interfering with the rest of the SMAC implementation. The rest of the SMAC implementation deals primarily with the sequence of frame transmissions that are associated with a particular phase and also with how the appropriate frames are prepared and processed. It does not worry about why a particular phase has been chosen. This modular approach in the SMAC development, simplifies its creation and guarantees a fast operational SMAC implementation version. It also provides the ability to add more advanced features in future versions of the protocol.

The WAPt generally includes several supporting components to aid in the smooth operation of the system. For example, it may have an information base (i.e., a database) of registered WATs that contain also information relative to each WAT. The information base includes: their hardware address; their MAC address; authentication and encryption keys associated with the WAT; the time at which the WAT was last polled; whether the WAT is currently in a sleep mode, etc. Also, depending on the sophistication of the WAPt phase-scheduling module, the WAPt sometimes contains and maintains an events scheduling list for the sequence of transmission events. The scheduling-module consults and updates this list as needed. This is based on: when it is supposed to poll a particular WAT; when it should send a periodic transmission to a specific WAT; when it should poll again a WAT that is in a sleep mode; when it is to poll for unregistered WATs, etc.

In a further embodiment, the WAPt includes buffer management intelligence for organizing transmissions frames destined to a WAT (resp. to the LAN) coming from the LAN (resp. coming from a WAT). For example, the WAPt provides a single common queue for all frames arriving from the LAN. In an alternative embodiment, the WAPt provides separate queues for these frames, one queue per WAT. In this case, the WAPt sometimes further prioritizes the WATs and forward frames to them according to a priority rule. A rule may be a command to send frames to WAT number-1 twice as often as to WAT number-2.

Figure 8:
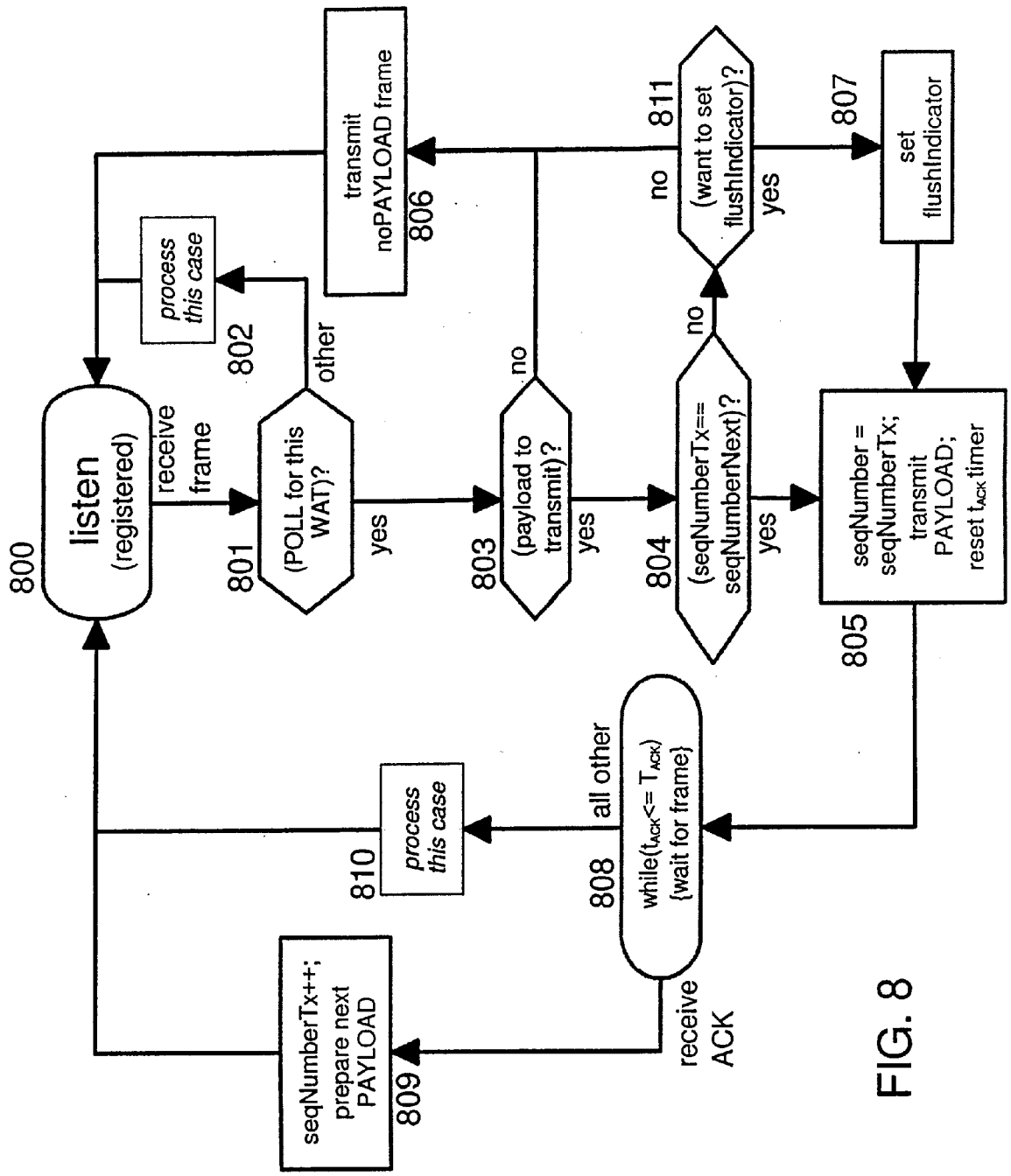
FIG. 8 shows an example of steps followed by a wireless attachment when it receives a POLL frame in accordance with the present invention.
Figure 9:
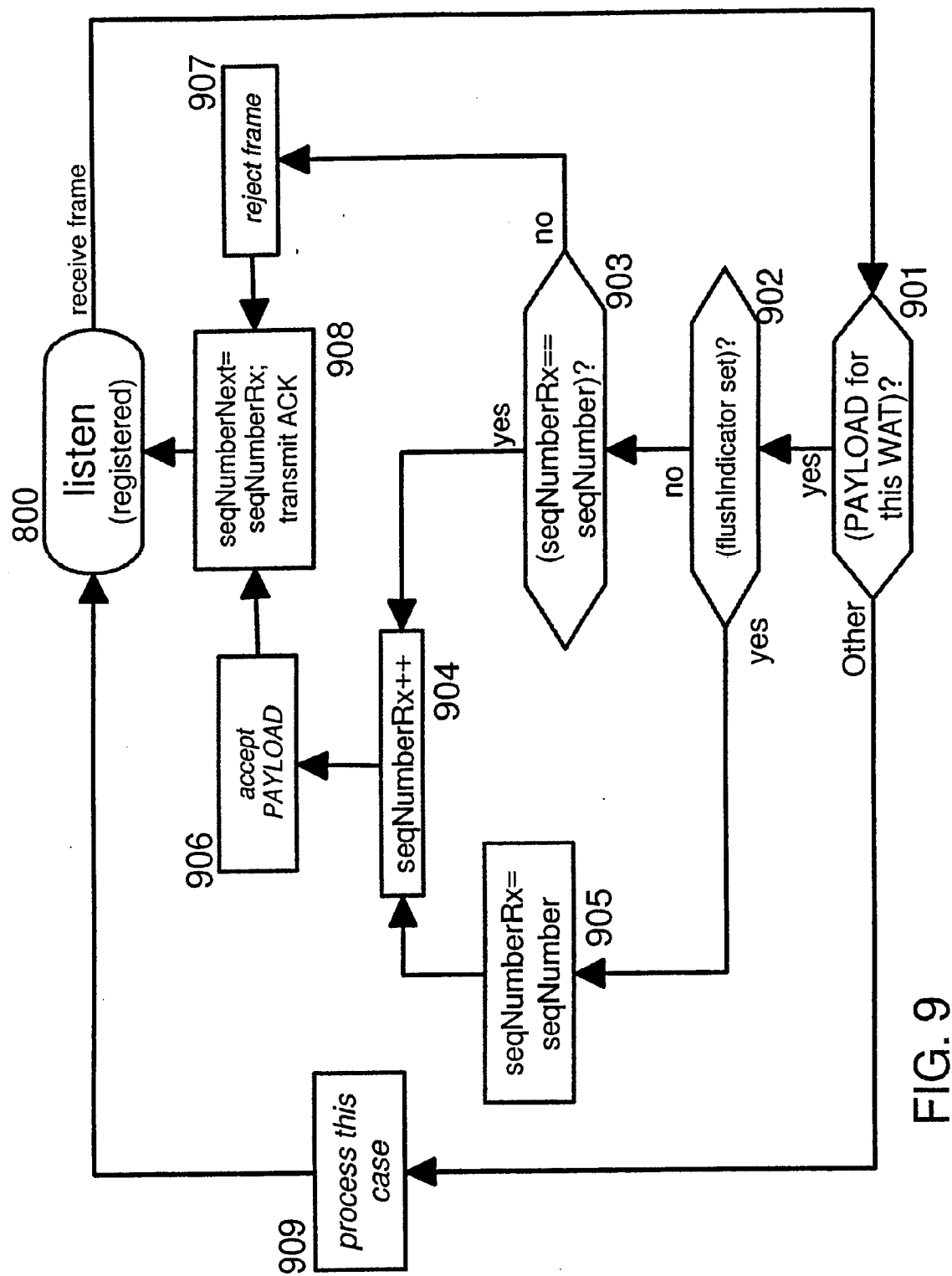
FIG. 9 shows an example of steps followed by a wireless attachment when it receives a PAYLOAD frame in accordance with the present invention.

Thus, FIG. 7 shows an example embodiment of the phases through which the WAPt goes to organize and control the flow of information in the network. FIG. 8 and FIG. 9 show the steps followed by a WAT following the receipt of a POLL or a PAYLOAD frame from the WAPt. These steps are similar for both unregistered WATs that wait to join the network, and registered WATs. The description focuses on the typical operation of a WAT when it is registered.

The proposed SMAC protocol has several options that may or may not all be active in a network. The following operational assumptions are made for FIGS. 8 and 9.

No implicit polls are assumed. Thus, for each PAYLOAD frame transmission from a WAT, the WAPt sends an explicit POLL frame to the WAT. The first frame that a WAT transmits following the receipt of a POLL frame destined to it is a PAYLOAD frame.

No implicit acknowledgments are assumed. Thus, for each PAYLOAD frame transmission, the receiving station (either the WAT or the WAPt) sends an ACK frame. The first frame that a station transmits following the receipt of a PAYLOAD frame destined to it is an ACK frame to the sender of the PAYLOAD frame (unless it is a noPAYLOAD frame described below).

Whenever a WAT is polled it always returns a PAYLOAD frame, even when it has no real PAYLOAD frame to send. In the latter case, the payloadsize field in the header of the PAYLOAD frame is set to 0. These frames are herein referred to as the noPAYLOAD frames. noPAYLOAD frames are not acknowledged by the WAPt.

Each WAT maintains two counters: seqNumberTx and seqNumberRx. The former counter contains the sequence number of the PAYLOAD frame that the WAT will normally transmit next. The latter counter contains the sequence number of the PAYLOAD frame the WAT expects to receive next. Both of these counters are used for the proper sequencing of transmitted PAYLOAD frames, as a means of acknowledging successfully transmitted frames (even when explicit ACK frames for these frames have been lost), and as a means of identifying the transmission of duplicate frames.

A WAPt maintains a pair of a seqNumberTx and seqNumberRx counters for each WAT in the network.

It is noted that additional and/or different operational assumptions may be made by those skilled in the art within the scope of the present invention.

In both FIGS. 8 and 9, the default state of a WAT is to "listen" for transmissions 800. If the WAT receives a transmission, it checks the type of the transmission, using the frameType field 609 in FIG. 6. FIG. 8 provides an example of the flow when the WAT receives a POLL frame, and FIG. 9 provides an example of the flow when the WAT receives a PAYLOAD frame.

As shown in FIG. 8, if the WAT receives a POLL frame destined to it (801 is 'yes'), the WAT proceeds to 803. If the frame is not a POLL frame (801 is 'no'), the WAT processes this case according to an appropriate procedure 802. This maybe along the steps shown in FIG. 9. If the FCS, (605 in FIG. 6,) does not check, or the frame is not destined to the WAT, the frame is discarded.

Upon receipt of the POLL frame, if the WAT has no PAYLOAD frame for transmission available (803 is 'no'), it responds with a noPAYLOAD frame 806 and returns to the listen state 800. If the WAT has a PAYLOAD frame to transmit (803 is 'yes'), it compares the value of its seqNumberTx counter with the seqNumberNext contained in the POLL frame. If the two numbers match (804 is 'yes'), the WAT transmits its PAYLOAD frame and resets a timer t_ACK 805. The value in the seqNumberTx counter is written in the seqNumber field in the header of the PAYLOAD header. The t_ACK timer is used for recovering from a possible deadlock situation in which the WAT may wait indefinitely for an ACK frame to be sent from the WAPt. If the numbers do not match (804 is 'no'), then the WAT may optionally override the expected PAYLOAD frame requested by the WAPt. If the WAT does not want to override the expected frame transmission (811 is 'no') it will respond with a noPAYLOAD frame 806. If it decides to override the expected transmission (811 is 'yes'), then it sets the flushIndicator field in the header of the PAYLOAD frame 807 and transmits the PAYLOAD 805. Note that upon receipt of this frame the WAPt appropriately resets its seqNumberRx counter for this WAT.

Following the transmission of the PAYLOAD frame, the WAT waits for the receipt of a frame for up to T_ACK time units 808. If the expected ACK frame destined to this WAT is received (808 is 'receiveACK'), the WAT increments its seqNumberTx counter by 1, prepares for its next (if any) PAYLOAD frame transmission 809, and returns to the listening state 800. If any other transmission is received instead (including frames whose FCS do not compute properly), or the timer t_ACK expires, the WAT processes this case 810 and returns back to the listening state 800. Typically, the processing in 810 involves the mere rejection of any received frame.

In case that no ACK frame is received, the WAT may take a note of this event and wait for the next POLL frame destined to it. If the POLL frame requests (via the use of the seqNumberNext field) the transmission of the same PAY- LOAD frame that the previous POLL frame requested, the WAT infers that its last transmission was corrupted and retransmits the same PAYLOAD frame. On the other hand, if the new POLL frame requests the transmission of the next PAYLOAD frame, the WAT infers that only the ACK frame for its last PAYLOAD frame transmission was corrupted. Hence, it transmits the next PAYLOAD frame and appropriately updates its seqNumberTx counter to reflect the proper sequence number for the PAYLOAD frame that it will transmit next.

In FIG. 9, the WAT is assumed to start in its default listening state 800 and then receives a frame. If the WAT receives a PAYLOAD frame destined to it (901 is 'yes'), the WAT proceeds to 902. If the frame is not a PAYLOAD frame (901 is 'no'), the WAT will process this case according to an appropriate procedure 909, e.g., along the steps shown in FIG. 8. If the FCS (605 in FIG. 6,) does not check, or the frame is not destined to the WAT, the frame is discarded.

If the flushIndicator field in the header of the PAYLOAD frame is set (902 is 'yes'), the WAT updates its seqNumberRx counter accordingly 905 and 904 and accepts the payload of the frame 906. If the flushIndicator field is not set (902 is 'no'), the WAT compares the value of its seqNumberRx counter with the seqNumber contained in the PAYLOAD frame. If the two numbers match (903 is 'yes'), the WAT increments the seqNumberRx by '1' 904 and accepts the PAYLOAD frame 906. If the numbers do not match (903 is 'no'), the WAT rejects the frame 907 and goes to 908.

Upon receipt 906 or rejection 907 of the payload frame, the WAT will send an ACK frame back to the WAPt with the value of seqNumberRx counter placed in the seqNumberNext field of the ACK frame 908. The WAPt uses this information to infer whether the proper PAYLOAD frame was sent or not. For example, if the last ACK frame sent by the WAT to the WAPt was not correctly received by the WAPt, the WAPt may resend the same PAYLOAD frame. In this case, the WAT reconfirms the receipt of this (same) PAYLOAD frame and requests the transmission of the next PAYLOAD frame. Those skilled in the art may modify or enhance the processes presented in FIGS. 8 and/or 9 without departing from the scope and concepts of the present invention.

Figure 10:
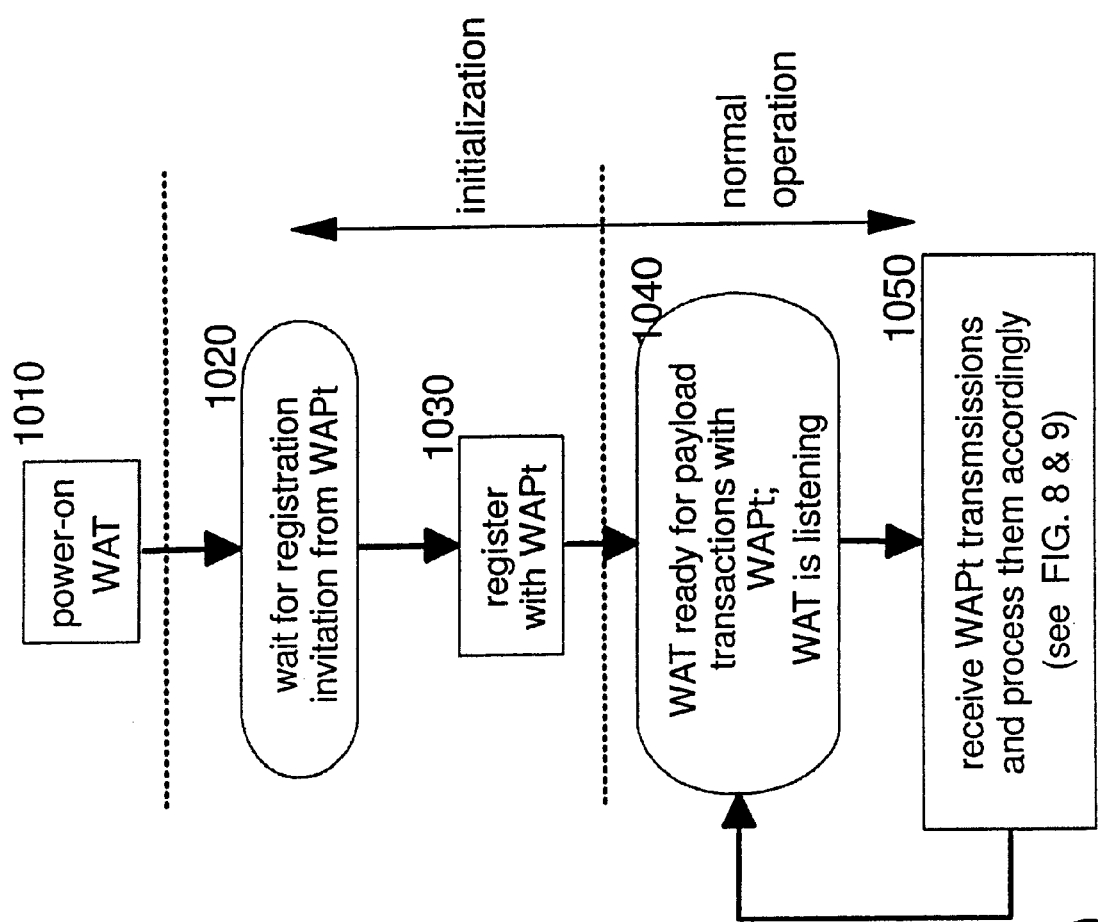
FIG. 10 shows an example of typical steps followed by a wireless attachment for properly communicating with a wireless access point in accordance with the present invention.

As described above, FIG. 7 shows the transmission phases that the WAPt uses for managing its network. FIGS. 8 and 9 show the actions taken by a WAT based on transmissions it receives from the WAPt. FIG. 10 summarizes the steps followed by a wireless attachment for properly communicating with the wireless access point. Initially, the WAT is powered-on 1010. The WAT is powered either directly from its host device, or the WAT from its own power source, e.g., the WAT may have a battery compartment for batteries that power just the WAT.

A powered-on WAT is in one of two modes in regard to a WAPt with which that it will communicate. The WAT will either be initializing, or it will be in a normal operational mode. While the WAT initializes, it waits to be invited 1020 by a registration invitation from the WAPt to join the network that the WAPt manages. In allowing new WATs to enter its network, a WAPt transmits invitation frames to which the WAT will respond 1030 with a frame that contains identification information for the WAT. An example WAT identification frame is the InvitationPAYLOAD frame of Table 4. The WAPt will then register the WAT and acknowledge this to the WAT sending a registration frame. An example registration acknowledge frame sent by the WAPt is the RegistrationPAYLOAD of Table 5.

Following the initialization, the WAT is now ready to participate in normal payload frame exchanges with the WAPt. The WAT typically listens 1040 for WAPt transmissions and act accordingly 1050. The process described for FIGS. 8 and 9 are typical procedures followed by the WAT following its initialization. While FIGS. 8, 9, and 10 show that a WAT normally listens for a WAPt transmission, power shaving procedures may dictate the WAT to "sleep" for a period of type. In general, while the WAT is sleeping, there is no need for it to be listening for WAT transmissions. Prior to going to sleep, the WAT typically notifies the WAPt of the duration of its sleep, so that the WAPt does unnecessarily poll or send frames to the WAT.

Although this embodiment assumes that variable length frames are transmitted, those skilled in the art may also implement the concepts of the present invention using fixed transmission frames. These fixed frames are usually referred to as slotted systems. Different embodiments employ a varying class of modulation techniques, including spread-sprectrum, FSK, FM, AM, etc., encoding, error correction, authentication, encryption, and other link level alternatives. These embodiments enable dynamic sharing of the communication resources among several host devices using a host interface on these devices that was originally designed only for dedicated point-to-point communications.

Generally, devices with client applications like the mobile hosts 101 in FIGS. 1, 2 and 3, 401 in FIG. 4, and 501 in FIG. 5 are generically identified as client devices or simply clients. The devices with server applications like the desktop host 102 in FIGS. 1 and 2, application host 301 in FIG. 3, 402 in FIG. 4, and 524 and 525 in FIG. 5 are generically identified as server devices or simply servers. The client attachment devices (which enable client application to connect transparently to server applications over a shared transmission medium) like the wireless attachment 411 in FIG. 4 and 528 in FIG. 5 are generically identified as attachment devices or simply attachments. Finally, the access point devices like the wireless access point devices 412 in FIG. 4 and 502 in FIG. 5 are generically identified as access points. These access point devices coordinate the transmissions from the attachments and transport these transmissions to the server devices over backbone networks whenever needed.

It is noted that the foregoing has outlined some aspects and embodiments of the present invention. This invention may be used for many applications. Thus, although the description is made for particular arrangements, systems and methods, the intent and concept of the invention is suitable and applicable to other arrangements and applications. Thus, it will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A communication system comprising:
   at least one attachment, each attachment attached to a client device at a client device port on the client device, said client device port supporting a dedicated point-to-point communication link between said client device and one other device, said at least one attachment allowing each client device to utilize a commonly shared transmission medium;
   an access point device connected to each said at least one attachment over the commonly shared transmission medium, the access point device allowing at least one client application in the client device to communicate with at least one server application in at least one server device accessible through the access point device; and a plurality of MAC modules, each attachment and the access point device having one of said MAC modules for executing a shared medium access protocol for the communication of data between each said attachment and the access point device.

2. A system as recited in claim 1, wherein the shared medium access protocol enables each attachment to coordinate simultaneous communication of data from and to its attached client device with communication of data from and to its attached client device of at least one other attachment, and each attachment communicates with the access point device.

3. A system as in claim 2, wherein the simultaneous communication is transmitted over a non-dedicated communication link connecting the attachment to the access point device to enable sharing the commonly shared transmission medium.

4. A system as recited in claim 3, wherein the bandwidth of the non-dedicated communication link is varied dynamically under the control of the shared medium access protocol.

5. A system as recited in claim 4, wherein the bandwidth is varied such as to share the commonly shared transmission medium for all attachments that are actively communicating with the access point device.

6. A system as recited in claim 1, wherein use of the commonly shared transmission medium is transparent to said at least one client application.

7. A system as recited claim 1, wherein the medium access protocol executed by the MAC module included within an attachment is non-identical and complementary with the medium access protocol executed by the MAC module included within the access point device.

8. A system as recited in claim 7, wherein the medium access protocol executed in the access point device prepares and sends command data packets to at least one attachment.

9. A system as recited in claim 8, wherein the medium access protocol executed in each attachment prepares and sends response data packets in response to the command data packets.

10. A system as recited in claim 9, wherein said response data packets include application data from said at least one client application in the client and destined to said at least one server application.

11. A system as recited in claim 10, wherein said response packets include MAC management data used for the management of a non-dedicated communication link connecting the attachment to the access point device to enable sharing the commonly shared transmission medium.

12. A system as recited in claim 8, wherein said command data packets include application data from said at least one server application.

13. A system as recited in claim 12, wherein said command data packets further include MAC management data used for the management of the non-dedicated communication link.

14. A system as recited in claim 1, wherein said client device port is a serial port.

15. A system as recited in claim 14, wherein said client device port and the dedicated point-to-point communication link supported over said client device port comprise an RS-232 serial port using the RS-232 dedicated point-to-point communication protocol.

16. A system as recited in claim 1, wherein the commonly shared transmission medium includes a single carrier frequency to be utilized by all the devices in the system.

17. A system as recited in claim 1, wherein the commonly shared transmission medium includes a first single carrier frequency for transmissions by the attachments and a second different carrier frequency for transmissions by the access point device.

18. A system as recited in claim 1, wherein the commonly shared transmission medium includes a spread spectrum channel where all devices in the system use the same spreading sequence in sync with each other.

19. A system as recited in claim 1, wherein the commonly shared transmission medium includes a spread spectrum channel in which all attachments use the same spreading sequence in synchronism with each other for their transmissions, while the access point uses a different spreading sequence for its own transmissions.

20. A system as recited in claim 1, wherein the shared medium access protocol includes a core module and at least one add-on module that can be optionally added to enhance the capabilities of the core MAC module.

21. A system as recited in claim 20, wherein the shared medium access protocol includes an initialization phase for inviting and registering to the system new attachments to client devices.

22. A system as recited in claim 21, wherein the initialization phase is initiated and repeated as needed by the access point.

23. A system as recited in claim 21, wherein each said attachment to a client device prior to commencing application payload transmissions with an access point waits to be registered by the access point device.

24. A system as recited in claim 20, where the modular shared medium access protocol separates functions of transmitting and receiving data over the shared transmission medium, from functions of interpreting payload data contained in said transmissions.

25. A system as recited in claim 24, where the modular shared MAC protocol as executed by the access point device further separates the functions from a function of scheduling which type of data transmission is to be performed next and to which attachment or group of attachments.

26. An attachment comprising:
a port for attaching the attachment to a client device, said attachment using the port to send data to, and receive data from, the client device on a dedicated communication link supported by the port;
a communication medium interface module to allow the attachment to send data to, and receive data from, another device over a shared communications medium;
a memory having buffer space for storing and processing data sent to, or received from, the client device; and
a medium access control (MAC) module having a MAC protocol layer and processing means for executing a shared MAC protocol.

27. An attachment as recited in claim 26, wherein the shared MAC protocol includes:
receiving application payload data from an application in the client device via the port wherein the application payload data is destined to at least one other application in at least one other device;
sending MAC management payload data generated within the MAC layer and destined to a complementary MAC layer of another device;
placing the application payload data in the buffer space, and processing the application payload data to form data packets in accordance with the shared MAC protocol; and transferring the data packets to the communication medium interface module for transmission over the shared communication medium in accordance to the shared MAC protocol executed in the attachment.

28. An attachment as recited in claim 27, wherein the medium access control module further comprises processing means for processing data in a reverse order by:
   receiving sent data over the communication medium interface module;
   processing the received sent data and forming processed data;
   directing the processed data to the attached client device via the port when the processed data are application payload data destined to the application in the client device; and
   directing the processed data to the MAC layer when the processed data are MAC management payload data and processing the MAC management payload data to adjust the behavior of the MAC layer according to information carried within said MAC management payload data.

29. An access point device comprising:
   a communication medium interface module to allow said access point device to send data to, and receive data from, at least one attachment over a shared communications medium;
   a memory buffer space for storing and processing the data sent to, or received from, said at least one attachment; and
   a medium access control module having a MAC layer and processing means for executing a shared MAC protocol, and
   wherein said shared MAC protocol includes:
      means for receiving application payload data from at least one application in a client device and destined to at least one other application in at least one other device accessible through the access point;
      means for sending MAC management payload data generated within the MAC layer and destined to a complementary MAC layer in an attachment to the client device;
      means for placing said application payload data in said buffer space;
      means for processing said application payload data and management payload data to form data packets in accordance to rules of the shared MAC protocol; and
      means for transferring said data packets to said communication medium interface module for transmission over the communication medium in accordance to rules of the shared MAC protocol; and
   wherein said medium access control module further comprises processing and buffer means for processing received data in a reverse order by:
   sending over the communication medium interface module and in accordance to the rules of the shared MAC protocol, application payload data to at least one application in a client device originated by at least one application in one other device accessible through the access point;
   receiving MAC management payload data generated within the MAC layer of a complementary MAC layer in an attachment to a client device;
   processing said application payload data and management payload data in accordance to the rules of the shared MAC protocol, and if the data are MAC management payload data further adjusting the behavior of said MAC layer in accordance to the information carried within said MAC management payload data; and
   wherein
   said access point device further comprises an access terminal used to attach said access point device to another data network, and said access point device uses said another data network to transport application data between at least one application server accessible through said another data network and the client devices.

30. An access point device as recited in claim 29, further comprising means for organizing transmissions of payload data to or from said application server accessible through said another data network in at least one queue of pending transmissions of payload data from or to said client devices.

31. An access point device as recited in claim 30, further comprising means for selecting to process and transmit pending transmissions of payload data from said one or more queues of pending transmissions of payload data according to a scheduling algorithm.

32. A system comprising:
   a plurality of attachments,
   each attachment attached to a different host device via a host port on said different host device, said host port supporting a dedicated point-to-point communication link between two of said different host devices, and
   each of said attachments including a medium access module having a MAC layer with a shared medium access protocol, and said protocol allowing each of the attachments to communicate simultaneously with host devices to which each of the attachments is attached over non-dedicated communication links by dynamically sharing a common broadcast communication medium using the shared medium access protocol.

33. A system as recited in claim 32, wherein the attachments, MAC layer, and shared MAC protocol provide an emulation over the commonly shared broadcast communication medium of a dedicated point-to-point communication link between pairs of host devices, wherein said emulation is transparent to said pairs of host devices.

34. An attachment device comprising:
   a particular attachment taken from the plurality of attachments within the system recited in claim 21, and
   a particular port for attaching the particular attachment with a particular host device, said particular port allowing the attachment to send data to, and receive data from, a particular attached host device using the host port and the dedicated point-to-point communication link of the system claimed in claim 32.

* * * * *